(12) United States Patent
Kappel

(10) Patent No.: US 12,253,631 B2
(45) Date of Patent: *Mar. 18, 2025

(54) SENSOR DEVICE, SENSOR MODULE, IMAGING SYSTEM AND METHOD TO OPERATE A SENSOR DEVICE

(71) Applicant: ams AG, Premstätten (AT)

(72) Inventor: Robert Kappel, Eindhoven (NL)

(73) Assignee: AMS AG, Premstätten (AT)

( * ) Notice: Subject to any disclaimer, the term of this patent is extended or adjusted under 35 U.S.C. 154(b) by 993 days.

This patent is subject to a terminal disclaimer.

(21) Appl. No.: 17/277,006

(22) PCT Filed: Sep. 12, 2019

(86) PCT No.: PCT/EP2019/074396
§ 371 (c)(1),
(2) Date: Mar. 17, 2021

(87) PCT Pub. No.: WO2020/058089
PCT Pub. Date: Mar. 26, 2020

(65) Prior Publication Data
US 2022/0026535 A1  Jan. 27, 2022

(30) Foreign Application Priority Data
Sep. 19, 2018  (EP) .................... 18195544

(51) Int. Cl.
*G01S 7/481* (2006.01)
*G01S 7/4863* (2020.01)
*G01S 17/89* (2020.01)

(52) U.S. Cl.
CPC .......... *G01S 7/4816* (2013.01); *G01S 7/4863* (2013.01); *G01S 17/89* (2013.01)

(58) Field of Classification Search
None
See application file for complete search history.

(56) References Cited

U.S. PATENT DOCUMENTS

| | | | | |
|---|---|---|---|---|
| 6,038,023 A | * | 3/2000 | Carlson ................. | G01J 3/4406 356/326 |
| 8,767,189 B2 | * | 7/2014 | Mase ..................... | G01S 17/10 356/3.01 |
| 8,786,748 B2 | * | 7/2014 | Oike ...................... | H04N 25/75 348/308 |
| 8,908,157 B2 | | 12/2014 | Eisele et al. | |
| 2006/0192086 A1 | | 8/2006 | Niclass et al. | |
| 2013/0300838 A1 | | 11/2013 | Borowski | |

(Continued)

FOREIGN PATENT DOCUMENTS

| | | |
|---|---|---|
| CN | 103733609 A | 4/2014 |
| CN | 105791718   | 7/2016 |
| CN | 107941248 A | 4/2018 |

OTHER PUBLICATIONS

Jahromi et al. "A Single Chip Laser Radar Receiver with a 9×9 SPAD Detector Array and a 10-Channel TDC," IEEE, 2015, pp. 364-367. (Year: 2015).*

(Continued)

*Primary Examiner* — Yuqing Xiao
*Assistant Examiner* — Jempson Noel
(74) *Attorney, Agent, or Firm* — MH2 Technology Law Group LLP

(57) ABSTRACT

A sensor device is provided and includes an array of photodetectors. A readout circuit is connected to the array of photodetectors and provides dedicated readout paths for each photodetector in the array, respectively. Further, the readout circuit includes at least one control terminal. An array of time-to-digital converters is electrically connected to converter output terminals of the readout circuit. Depending on a control signal to be applied at the at least one control terminal, the readout circuit is arranged to electrically connect through the readout paths of photodetectors of a first subarray (11) to the converter output terminals of the readout circuit, respectively, thereby rendering the photodetectors of the first subarray active and photodetectors of a second subarray inactive.

14 Claims, 6 Drawing Sheets

(56) References Cited

U.S. PATENT DOCUMENTS

| | | | |
|---|---|---|---|
| 2014/0021356 | A1 | 1/2014 | Zwaans et al. |
| 2014/0175294 | A1 | 6/2014 | Frach |
| 2015/0041625 | A1 | 2/2015 | Dutton et al. |
| 2017/0242109 | A1* | 8/2017 | Dussan .................. G01S 17/42 |
| 2018/0102407 | A1 | 4/2018 | Moore et al. |
| 2018/0259625 | A1 | 9/2018 | Gnecchi et al. |
| 2019/0018117 | A1* | 1/2019 | Perenzoni ................ G01C 3/08 |

OTHER PUBLICATIONS

International Search Report and Written Opinion in corresponding International Application No. PCT/EP2019/074396 mailed on Dec. 4, 2019, 12 pages.

Jahromi et al., "A Single Chip Laser Radar Receiver with a 9×9 SPAD Detector Array and a 10-Channel TDC," IEEE, 2015, pp. 364-367.

Lindner et al., "A High-PDE, Backside-Illuminated SPAD in 65/40-nm 3D IC CMOS Pixel With Cascoded Passive Quenching and Active Recharge," IEEEE Electron Device Letters, vol. 38, No. 11, Nov. 2017, pp. 1547-1550.

Chinese Examination Report dated May 25, 2023, issued in Chinese Patent Application No. 201980061368.X, with English translation, 12 pages.

Villa, F. et al. "High linearity SPAD and TDC array for TCSPC and 3D ranging applications" Feb. 8, 2015, Quantum Sensing and Nanophotonic Devices, vol. 9370.

Zhang, Zilong: "SPAD Pixel Design for Tof-3D Image Sensors" Jul. 15, 2017, China Master's Theses Full-text Database (English Abstract only).

* cited by examiner

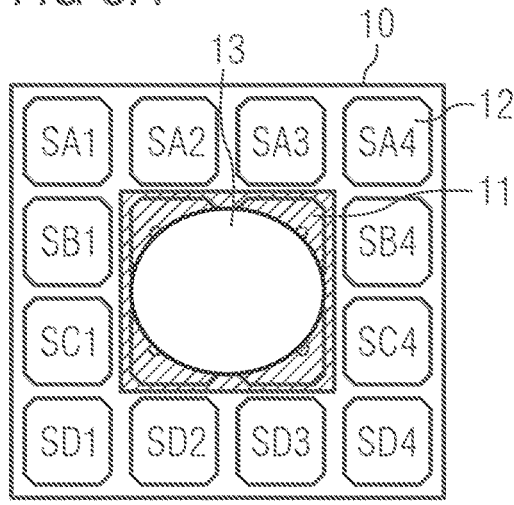
FIG 5A -Prior Art-
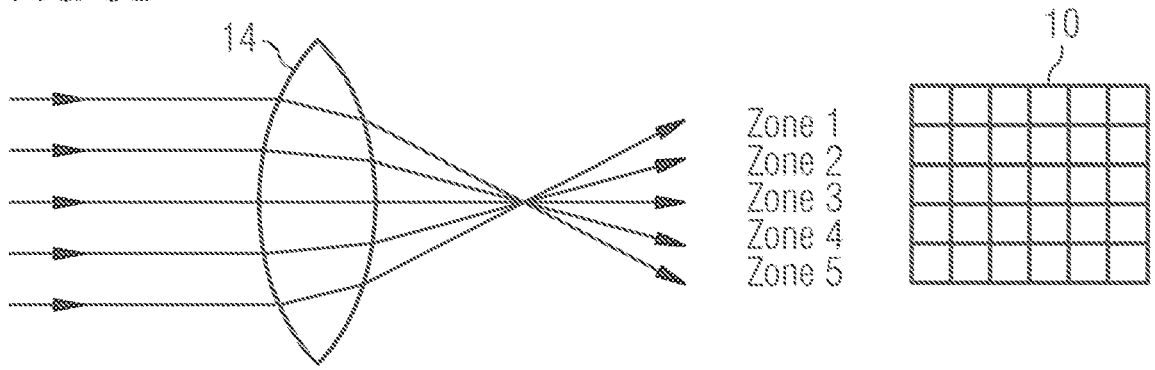
FIG 5B -Prior Art-
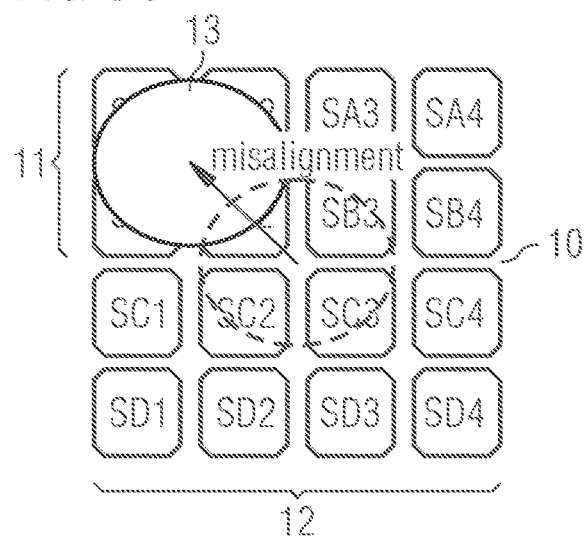
FIG 5C -Prior Art- FIG 6A  -Prior Art-
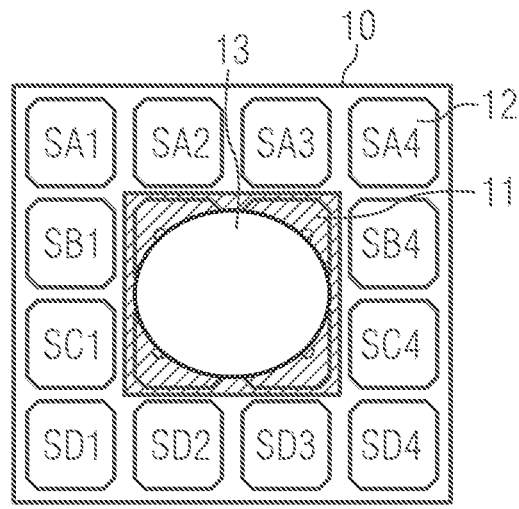
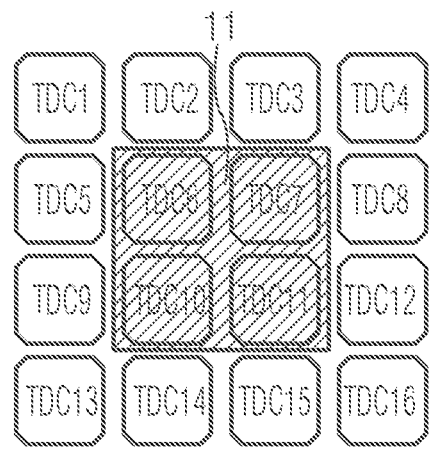

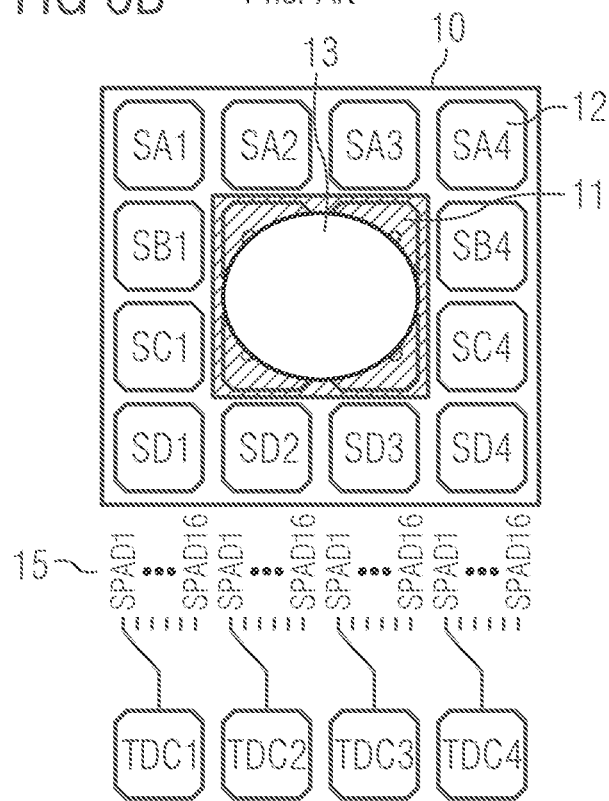
FIG 6B -Prior Art-
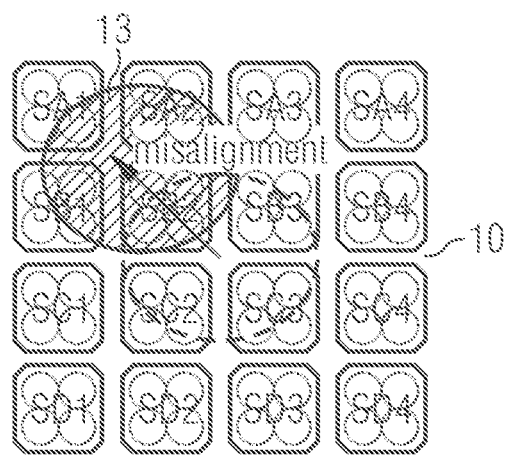
FIG 6C -Prior Art-

SENSOR DEVICE, SENSOR MODULE, IMAGING SYSTEM AND METHOD TO OPERATE A SENSOR DEVICE

CROSS-REFERENCE TO RELATED APPLICATIONS

The present application is the national stage entry of International Patent Application No. PCT/EP2019/074396, filed on Sep. 12, 2019, and published as WO 2020/058089 A1 on Mar. 26, 2020, which claims the benefit of priority of European Patent Application No. 18195544.4, filed on Sep. 19, 2018, all of which are hereby incorporated by reference in their entirety.

FIELD

This disclosure relates to a sensor device, a sensor module, an imaging system and a method to operate a sensor device.

BACKGROUND OF THE DISCLOSURE

A single-photon avalanche diode, or SPAD for short, is a solid-state photodetector which finds increasing application in optical sensors including spectroscopy, medical technology, consumer and security applications amongst others. SPAD arrays combine high sensitivity and spatial resolution, e.g. for highly accurate distance measurements in time-of-flight sensors. In a SPAD array often multiples zones are defined by a single pixel or a subarray of pixels. For example, a given zone in SPAD array embedded in direct time of flight systems may be assigned to a zone in an image to create 3D spatial image data.

Optical sensors, especially those intended for use in mobile devices, are typically embedded in dedicated sensor modules which support the optical properties of the sensor. For example, sensor modules may provide a small, robust package, with built-in apertures and optics. During the assembly process of sensor modules, however, alignment of optics with respect to the sensor array may vary which leads to the problem of an offset in the mapping of illuminated zone on the SPAD array and a field of view of the optics, for example.

FIG. 5A shows a prior art SPAD array. The array 10 comprises individual SPADs which are arranged in rows and columns. A row position is denoted with a capital letter from A, B, C and D. A column position is denoted with an integer number from 1, 2, 3, and 4. For example, the SPAD located in the first row and first column, i.e. at row position A and column position 1 is denoted by the reference numeral SA1.

The drawing shows SPADs using this nomenclature. Furthermore, the drawings indicate a first subarray 11 and a second subarray 12. In this representation the first subarray 11 is located in a center of the array 10. The second subarray 12 is surrounding the first subarray 11.

Consider a sensor module (not shown) and the SPAD array 10 implemented inside the sensor module. During assembly the SPAD array 10 is aligned with a lens 14 or optics which is arranged in the module, e.g. as part of a sensor package.

Light incident of the sensor module is directed inside the module and towards the SPAD array 10 by means of the lens 14 as shown in FIG. 5B. In the aligned configuration shown in FIG. 5A light illuminates the first subarray 11 in the center of the array 10 (see spot 13). In this example the first subarray 11 comprises four zones defined by SPADs SB2, SB3, SC2, and SC3, respectively. The center is surrounded by the second subarray 12 which constitutes a ring of SPAD zones for redundancy. The redundant area which is occupied by the second array 12 can be used to account for misalignment, e.g. when the spot 13 does not leave the SPAD array 10.

FIG. 5C shows the same SPAD array. However, in this drawing the spot 13 is illuminates not only parts of the first subarray 11 in the center of the array 10 but also parts of the second subarray 12, i.e. some of the redundancy SPADs. In this example an alignment error is shown as an offset of one zone, e.g. a shift of spot 13 along the rows and columns by one row and column position, respectively. Due to the misalignment between sensor and lens the spot 13 is mapped to a different region on the array 10. In this example, the spot 13 is seen by the upper-left zones.

Assuming only a single SPAD representing one zone, the prior art has come up with different alignment compensation schemes. For example, for each zone a dedicated time-to-digital converter, TDC, is added for redundancy which results in a considerable overhead. FIG. 6A shows the SPAD array 10 with the 4×4 configuration discussed above. Furthermore, an array of TDCs 14 is implemented and hard-wired to the individual SPADs. The TDCs are denoted by reference numerals TDC1 to TDC16. It is apparent that the first subarray 11 of active SPADs uses only four TDCs while 12 TDCs are provided for the second array 12 as redundancy and, thus, may not be used.

FIG. 6B shows another prior art solution. In this example the array of SPADs is only connected to four TDCs. In fact, each SPAD is connected to a dedicated TDC. The mapping is done by multiplexers 15. Therefore, the number of TDCs corresponds to the number of zones without redundancy. On the other hand, the readout routing becomes very complex especially with increasing number of zones. Direct time of flight systems may be improved when the propagation delay from the SPAD to the TDC is equal for each SPAD. The issue may become even more complex if each zone is represented by multiple SPADs, e.g. four SPADs per zone as shown in FIG. 6C. In that case it may happen that individual SPADs of a zone correspond to a different zone than the other. Having a fixed readout routing to a TDC may lead to mix-up counts from different zones at a TDC.

It is an objective to provide a sensor device, a sensor module and a method to operate a sensor device which allow reducing the impact of optical misalignment.

This objective is achieved by the subject matter of the independent claim. Further developments and embodiments are described in dependent claims.

SUMMARY OF THE DISCLOSURE

It is to be understood that any feature described hereinafter in relation to any one embodiment may be used alone, or in combination with other features described hereinafter, and may also be used in combination with one or more features of any other of the embodiments, or any combination of any other of the embodiments, unless explicitly described as an alternative. Furthermore, equivalents and modifications not described below may also be employed without departing from the scope of the sensor device, sensor module and method to operate a sensor device as defined in the accompanying claims.

In at least one embodiment a sensor device comprises an array of photodetectors. A readout circuit is connected to the array of photodetectors and provides dedicated readout paths for each photodetector in the array, respectively. Furthermore, the readout circuit comprises at least one control terminal. An array of time-to-digital converters, TDCs for short, is electrically connected to converter output terminals of the readout circuit.

During operation a control signal can be applied at the at least one control terminal. Depending on the control signal the readout circuit is arranged to electrically connect through the readout paths of photodetectors of a first subarray to the converter output terminals of the readout circuit, respectively. As a consequence the photodetectors of the first subarray are active and the photodetectors of the second subarray are inactive.

The control signal can be used to shift the photodetectors of the first subarray with respect to the array of photodetectors. The photodetectors of the first subarray are active in the sense that their respective readout paths are electrically connected to the converter output terminals of the readout circuit, respectively. Thus, the photodetectors of the first subarray are connected to respective time-to-digital converters of the array of time-to-digital converters. For example, a sensor signal, such as an event pulse of a single-photon avalanche diode, or SPAD for short, is routed to the time-to-digital converters for further processing.

The readout paths of the photodetectors of the second array, however, are not electrically connected to the converter output terminals and, thus, are not connected to a time-to-digital converter of the array of time-to-digital converters. Thus, the photodetectors of the second array can be considered inactive. For example, a sensor signal, such as an event pulse of a single-photon avalanche diode, is not routed to the time-to-digital converters for further processing.

However, whether a photodetector is associated with the first or second subarray is determined by means of the control signal. As the control signal determines a configuration of readout paths that are electrically connected to the converter output terminals the first subarray can be shifted with respect to the array of photodetectors. Thus, the inactive photodetectors of the second subarray can be considered as redundant photodetectors which can be activated if need be, e.g. as a result of a calibration process.

Shifting of the first subarray can in principle compensate for an offset introduced by optical misalignment, e.g. by introducing a reversed offset using the readout paths. Therefore sensor signals essentially become re-centered before entering the array of time-to-digital converters. Misalignment is compensated by re-centering a spot of incident light to the photodetectors of the first subarray, for example. Therefore a hard-wired interface connecting the converter output terminals to the array of TDCs can be used. No multiplexing or complex switching schemes need to be used. This technique can be scaled to arrays of any number of photodetectors. Furthermore, no active lens alignment is needed, e.g. during the assembly process of a sensor module or packaging. This allows for lower costs. The proposed sensor device can be used in various optical sensor types, such as time-of-flight systems.

In at least one embodiment the readout circuit is arranged to electrically connect through the readout paths of photodetectors of the first subarray to the output terminals of the readout circuit all at a time.

For example, in an array of 4×4 photodetectors the first subarray may be represented by four photodetectors. Then, the array of time-to-digital converters may have four time-to-digital converters. The photodetectors collect light in parallel and the readout circuit routes corresponding sensor signals to the time-to-digital converters in parallel as well. For example, a number of photodetectors in the first subarray may correspond to a number of time-to-digital converters in the array of time-to-digital converters.

The proposed readout circuit has the benefit that no multiplexing of time-to-digital converters is needed.

Furthermore, a propagation delay from the photodetectors to the time-to-digital converters can be reduced and synchronized to the parallel operation of detectors and converters.

In at least one embodiment the readout circuit comprises a plurality of input terminals. Each photodetector is connected to a dedicated input terminal of the plurality of input terminals. The readout circuit comprises a plurality of output terminals. The plurality of output terminals comprises the converter output terminals.

Depending on the control signal applied to the control terminal the sensor device is set into a ground configuration or into a calibrated configuration. Thus, the control signal determines whether the sensor device is in the ground configuration or in the calibrated configuration. In the ground configuration the readout paths electrically connect the input terminals dedicated to a photodetector of the array of photodetectors to dedicated output terminals, respectively. In the calibrated configuration the readout paths electrically connect the input terminals dedicated to the photodetector of the array of photodetectors to neighboring output terminal which are different from the dedicated output terminal in the ground configuration, respectively.

The first subarray of photodetectors is shifted with respect to the array of photodetectors. This shifting involves routing the readout paths between the input terminals and the output terminals. For example, in the ground configuration the photodetectors of the first subarray are connected to the converter output terminals and thereby to the array of time-to-digital converters. In the calibrated configuration a different set of photodetectors defines the first subarray. With no control signal applied to the control terminal, however, their respective readout paths would still be connected to their dedicated output terminals which may not coincide with the converter output terminals. In order to connect the photodetectors of the first subarray to the converter output terminals the control signal effectively reroutes or shifts the readout paths of the photodetectors of the first subarray to the converter output terminals, for example.

The routing or shifting of readout paths can be accomplished by means or the readout circuit. The time-to-digital converters do not need to be adapted to the readout circuit to establish this functionality. Thus, the array of time-to-digital converters can be implemented using a hard-wired circuit layout.

In at least one embodiment the photodetectors of the array of photodetectors are arranged in rows and/or columns. In the ground configuration, the first subarray is determined by photodetectors located in a center of the array of photodetectors. In the calibrated configuration the first subarray is shifted along the rows and/or columns such that the first subarray is determined by photodetectors located with an offset relative to the center of the array of photodetectors.

For example, consider the sensor device being embedded in a sensor module comprising optics. Typically, the array of photodetectors is aligned with respect to the optics of the sensor module. For example, the center of the array can be positioned in a field of view of the optics in order to provide better illumination. Misalignment of the optics with respect to the array of photodetectors manifest itself by an optical offset. This optical offset can be compensated for using the offset relative to the center of the array of photodetectors. This offset may have the inverse value of the optical offset and can be implemented by shifting the first subarray along the rows and/or columns of the array of photodetectors.

Thus, the shifting along the rows and/or columns provides the means for mapping the optical offset in terms of configuration of the sensor device. In general it is possible to have shifting only along the row, only along the column or both.

In at least one embodiment the readout circuit is arranged to shift the first subarray along the rows and/or columns by a same number of row positions and/or column positions. In general, it is possible to shift the first subarray along one or more row positions and/or along one or more compositions. However, by implementing the shifting using the same number of positions it may be assured that each photodetector in the array of photodetector has a single dedicated readout path. Thus, there is no overlap of readout paths such as connection to a same output terminal. For example, after shifting the readout paths of the photodetectors of the first subarray are connected to their dedicated converter output terminal, respectively.

In at least one embodiment the readout circuit comprises at least one row shifting unit which is arranged to shift the first subarray along the rows relative to the array of photodetectors. Alternatively, or in addition, the readout circuit comprises at least one column shifting unit which is arranged to shift the first subarray along the columns relative to the array of photodetectors, wherein the at least one column shifting unit is connected in series with the at least one row shifting unit.

The readout circuit can be split using the row shifting unit and/or column shifting unit. This way there are dedicated units which effect row shifting or column shifting only. As a consequence complexity of circuit layout, e.g. interconnect of terminals along the readout paths can be reduced.

Furthermore, row shifting unit and column shifting unit can be considered interchangeable as the definitions of row or column in an array is interchangeable. In fact, the same unit can be used to shift along a row or a column. For example, two row shifting units can be connected such as to transpose a row to column. Thus, one of the two row shifting units is arranged to shift along a row, whereas the second of the two row shifting units is arranged to shift along the column by means of their transposed interconnection. This concept can be scaled to any number of row shifting units and column shifting units.

In at least one embodiment the readout circuit comprises a cascade of row shifting units connected in series, wherein each row shifting unit in the cascade is arranged to shift the first subarray along the rows relative to the array of photodetectors by a different number of row positions.

Alternatively, or in addition, the readout circuit comprises a cascade of column shifting units connected in series, wherein each column shifting unit in the cascade is arranged to shift the first subarray along the columns relative to the array of photodetectors by a different number of column positions.

By cascading multiple instances of the row shifting units and/or column shifting units the first subarray can be shifted by multiple rows or columns as well. The cascading can be done by a binary weighted approach. For example, a first row shifting unit in the cascade shifts by ±1 row positions, a second row shifting unit in the cascade shifts by ±2 row positions, a third row shifting unit in the cascade shifts by ±3 row positions, a fourth row shifting unit in the cascade shifts by ±4 row positions, and so on. This weighted approach can be applied in a same manner for both row shifting units and column shifting units.

One possible way to implement the binary weighted approach using the cascades is to arrange several control signals which are applied to the row shifting units and/or column shifting units in the cascades, respectively. This way one row shifting unit and/or column shifting unit can be selected to shift the first subarray by its corresponding row and/or column positions. The remaining row shifting units and/or column shifting units can be deselected by the control signals and then do not shift the first subarray. This way an intended offset can be set without complex circuit layout.

In at least one embodiment the at least one row shifting unit and/or the at least one column shifting unit comprises a number of shifter circuit and a number of selector circuits. For example, the number of shifter circuits and the number of selector circuits correspond to the number of photodetectors in a row and/or in a column.

For example, each readout path may comprise one shifter circuit and one selector circuit. The shifter circuits may be arranged to shift the readout paths to a given output terminal, respectively. Thus, the shifter circuits determine whether a row/column position is shifted and also determine the number of row/column positions by which the position is to be shifted. The shifter circuits operate in response to the control signals.

The selector circuits may be operated in response to control signals as well. The selector circuits can be individually activated or deactivated and, thus, route a readout path to a dedicated output terminal. The dedicated output terminal is activated or deactivated in response to the control signal applied to the associated selector circuit, respectively.

The shifter circuits and selector circuits provide convenient control of readout paths for each individual photodetector in the array of photodetectors. In a certain sense the shifter circuit and selector circuits build up a network of readout paths which can be individually selected and rerouted to dedicated output terminals. The circuits can be implemented with digital logic, for example.

In at least one embodiment the shifter circuits are arranged to split the readout paths into a branch of electrical connection lines. The electrical connection lines connect the input terminal dedicated to a photodetector of the array of photodetectors to the dedicated output terminal. Furthermore, the electrical connection lines connect the input terminal dedicated to a photodetector of the array of photodetectors to at least one neighboring output terminal which is different from the dedicated output terminal, respectively.

The electrical connection lines are selectable by means of the control signals, such that one of the electrical connection lines is activated while the other electrical connection lines are in active. For example, the electrical connection lines may be coupled to respective logical gates, such as NAND or NOR gates, to which respective control signals are applied. Depending on the control signals a readout path is a directed along a specific electrical connection line if a logical condition is fulfilled. This way a given electrical connection line is either activated or deactivated. Thus, the shifter circuits can implemented with logical components and can be hard-wired.

In at least one embodiment the selector circuits comprise an input side connected to the electrical connection lines of the at least two shifter circuits. Furthermore, an output side is connected to the dedicated output terminals, respectively. The selector circuits may be individually addressed to either route a readout path to another shifting unit or to provide a sensor signal at a dedicated output terminal such as the converter output terminals.

In at least one embodiment the photodetectors comprise photodiodes, single-photon avalanche diodes, SPADs, and/or avalanche photodiodes, APDs. The proposed sensor device can be used with different types of photodetectors, for example, those which are compatible with time-to-digital converters.

In at least one embodiment the sensor module comprises at least one sensor device according to one or more aspects described above. Furthermore, a sensor package encapsulates the at least one sensor device. Optics are arranged in the sensor package, wherein the first subarray of photodetectors is located in a field of view of the optics.

The proposed sensor device can be used in various sensor modules such as optical sensors, rangefinders, and proximity sensors to name but a few. Basically, the proposed sensor device can be embedded into sensor modules which facilitate an array of photodetectors which may need to be aligned with respect to optics such as a lenses or lens systems. In order to account for misalignment during manufacture of the sensor module the sensor device provides the means to compensate for offset. For example, the sensor device embedded in the sensor module can be operated in its ground configuration or be calibrated and operated in its calibrated configuration. The one or more control signals may be provided by an external terminal connected to the at least one control terminal or by means of internal components such as a microprocessor or state machine, or the like.

In at least one embodiment the at least one sensor device, the sensor package and the optics are arranged as a time of flight sensor module. For example, the sensor package comprises one or more chambers into which one or more sensor devices are positioned. The optics are arranged in apertures of the chambers and, correspondingly, the sensor device is arranged below the apertures inside the sensor package.

Time-of-flight applications benefit from fast response times and low propagation delay from the photodetectors to the time-to-digital converters. This allows for higher accuracy of time-of-flight and, thus, improved range detection or 3D imaging.

In at least one embodiment an imaging system comprises at least one sensor device according to the aspects discussed above and a host system wherein the at least one sensor device is embedded in. The host system comprises one of a mobile device, a 3D-camera, or a spectrometer, for example.

For example, the mobile device can be a mobile phone, Smartphone, computer, tablet or the like. The sensor device can be implemented into the mobile device using a sensor module discussed above. This way the sensor device can be used as an optical sensor, e.g. rangefinders, proximity sensors, color sensors or time-of-flight sensors. In some embodiments the sensor device or sensor module comprises internal electronics for its operation such as a microprocessor or state machine, or the like. In other embodiments, however, the imaging system provides electronics to operate the sensor device.

For example, the 3D-camera comprises a time-of-flight, TOF, camera and is arranged to 3D imaging. Typically, such as system comprises an illumination unit such as a photodiode or laser diode. One example illumination unit comprises a Vertical Cavity Surface Emitting Laser, VCSEL, to illuminate an external object. Typically the illumination unit emits modulated light with high speeds up to some 100 MHz. Alternatively, a single pulse per frame such as 30 Hz can be used.

Optics such as a single lens or objective lens are used to gather light being reflected from the external object and to image onto the sensor device, e.g. CMOS or CCD photo sensor. An optical band-pass filter typically passes the light with the same wavelength as the illumination unit.

The sensor device can be used to determine a time-of-flight to the external object, For example, the photodetectors can be read out and provide sensor signal which are a direct measure of the time the light has taken to travel from the illumination unit to the object and back to the array.

The host system or sensor module comprising the sensor device comprises driver electronics to control the illumination unit and the sensor device. Furthermore, the sensor module or sensor device may have an interface in order to communicate with the host system.

In a 3D-camera imaging system two types of images may be generated: a regular 2D image and an additional 1D image with distance information. These two images can be combined to yield a 3D image. The sensor device allows for compensating an optical offset on a device-basis. Thus, 2D image and an additional 1D image can be aligned with higher accuracy.

In a spectrometer incident light of a defined wavelength may be imaged on a defined position of the sensor device, e.g. a defined photodetector or array of photodetectors such as the first subarray. In order to improve spectral resolution it can be important to account of optical offsets. The sensor device allows doing so on a device-basis.

In at least one embodiment a method to operate a sensor device is applied to a sensor device comprising an array of photodetectors. The method comprises the steps of providing dedicated readout paths for each of photodetector in the array, respectively. A readout circuit provides the readout paths and is connected to the array of photodetectors. A control signal is applied to the readout circuit. Depending on the control signal, the readout paths electrically connect through the photodetectors of the first subarray to dedicated time-to-digital converters, respectively. Thereby the photodetectors of the first subarray are rendered active and photodetectors of a second subarray inactive.

The first subarray can be shifted with respect to the array of photodetectors and compensate for an offset introduced by lens misalignment, e.g. by introducing a reversed offset using the readout paths. Misalignment may occur when the sensor device is embedded in a sensor module, for example. Sensor signals essentially become re-centered before entering the array of time-to-digital converters. Misalignment is compensated by re-centering a spot of incident light to the photodetectors of the first subarray, for example. Therefore a hard-wired interface connecting the array of TDCs can be used. No multiplexing or complex switching schemes need to be used. This technique can be scaled to any number of photodetectors in the array. Furthermore, no active lens alignment is needed, e.g. during the assembly process of a sensor module or packaging. This allows for lower costs. The proposed sensor device can be used in various optical sensor types such as time-of-flight systems.

In at least one embodiment the photodetectors of the array of photodetectors are arranged in rows and/or columns. The method further comprises the steps of locating, in a ground configuration, the first subarray in the center of the array of photodetectors. In a calibrated configuration the first subarray is shifted depending on the control signal along the rows and/or columns. This way the first subarray is located with an offset relative to the center of the array of photodetectors.

The sensor systems can be operated in the ground configuration or in the calibrated configuration, e.g. to account for an offset due to optical misalignment. This offers flexible application of the sensor device as the device can be calibrated after assembly of a sensor module, for example. There may be no need for further external means applied to the sensor module after assembly.

Further implementations of the method to operate a sensor device are readily derived from the various implementations and embodiments of the sensor device, sensor module, imaging system and vice versa.

In the following, the concept presented above is described in further detail with respect to drawings, in which example embodiments are presented.

BRIEF DESCRIPTION OF THE DRAWINGS

FIG. 5A shows a prior art SPAD array of a sensor device, FIG. 5B shows a prior art SPAD array aligned with a lens, FIG. 5C shows a prior art SPAD array of a sensor device with optical misalignment, FIG. 6A shows a prior art SPAD array of a sensor device with hard-wired TDCs, FIG. 6B shows a prior art SPAD array of a sensor device with multiplexers, and FIG. 6C shows a prior art SPAD array of a sensor device with optical misalignment.

DETAILED DESCRIPTION

Figure 1A:
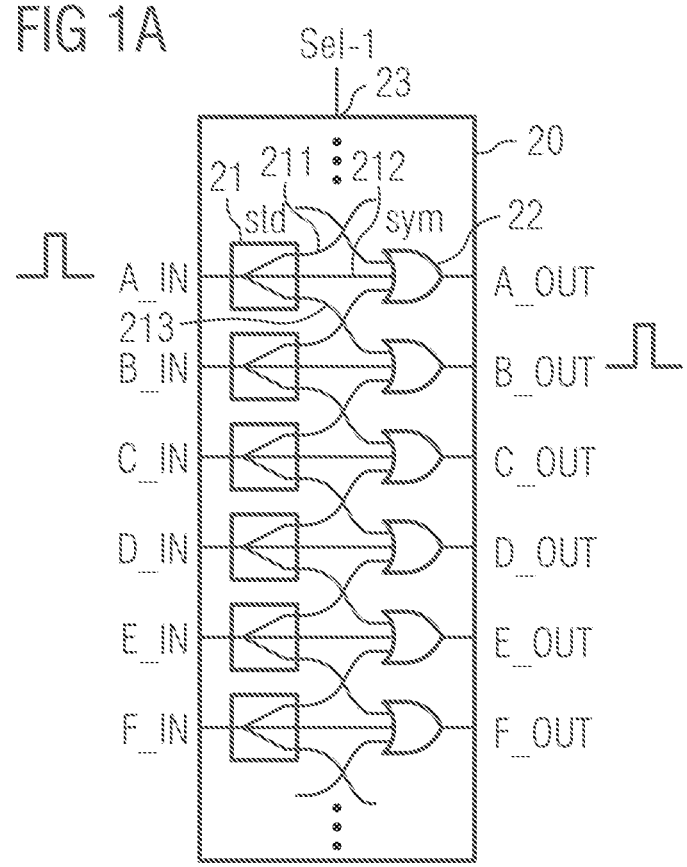
FIG. 1A shows an example embodiment of a readout circuit.

FIG. 1A shows an example embodiment of the readout circuit. The readout circuit 20 comprises a row shifting unit connected to an array of photodetectors 10 (not shown). In this example the array 10 comprises a plurality of single photon avalanche photodiodes, SPAD, which are arranged in rows and/or columns. The drawing depicts one row from the array of photodetectors 10 as a representative example. The aspects discussed herein can be applied to other rows and/or columns in the array as well.

The row in this example comprises six SPADs denoted as SA1, SB1, SC1, SD1, SE1, and SF1, which indicates row 1 as an example. Respective detector outputs (not shown) are connected to dedicated input terminals of the readout circuit, respectively. These input terminals are arranged (in ascending order from A to F) as A_IN, B_IN, C_IN, D_IN, E_IN, and F_IN.

The input terminals are further connected to respective shifter circuits 21. The shifter circuits 21 split into several electrical connection lines 211, 212, 213. In this example the shifter circuits 21 split into three electrical connection lines 211, 212, 213. Each shifter 21 circuit is connected via one of the corresponding electrical connection lines 211, 212, 213 to an input side of respective selector circuits 22. For example, a center electrical connection line 212 is connected to the input side of a dedicated selector circuit 22 such that a path established via the corresponding input terminal A_IN, shifter circuit 21, center electrical connection line 212 and dedicated selector circuit 22 can be considered a direct readout path. The direct readout paths are readout paths dedicated to the input terminals of the SPADs, respectively. The dedicated selector circuits 22 are connected to dedicated output terminals A_OUT, BOUT, C_OUT, D_OUT, E_OUT, and F_OUT (in ascending order from A to F). Further details of the shifter circuits are discussed with respect to FIG. 1B.

The remaining electrical connection lines 211, 213 of the shifter circuits 21, however, are connected to neighboring selector circuits 22. These electrical connection lines can be considered branches of the shifter circuits 21. Instead of directly connecting the input terminals to their dedicated output terminals (e.g. A_IN to A_OUT), or via direct readout paths, the electrical connection lines 211, 213 from the branches connect the input terminals to neighboring output terminals, (e.g. A_IN to B_OUT), i.e. output terminals different from the dedicated output terminals. The selector circuits 22 comprise a logic gate (an AND gate for example) to assure that only one readout path is electrically connected to the output terminals, respectively. The readout paths which are not direct readout paths can be considered indirect readout paths.

The readout path comprises a control terminal 23. This control terminal can used to apply a control signal SEL. The control signal alters readout paths of the readout circuit. In other words, the control signal determines a configuration, i.e. which readout paths are established to electrically connect the SPADs of array 10 via the input terminals to specific output terminals.

In a ground configuration no control signal SEL may be applied or a control signal SEL0 representative of a ground state. In this configuration the direct readout paths are electrically connecting the input terminals to their dedicated output terminals (e.g. A_IN to A_OUT). In a calibrated configuration a different control signal (for example SEL−1 or SEL+1) may be applied which is representative of a calibration state. In this configuration the direct readout paths are not electrically connecting the input terminals to their dedicated output terminals. Rather one of the indirect readout paths is established and electrically connects the input terminals to neighboring output terminals, i.e. output terminals different from the dedicated output terminals (e.g. A_IN to B_OUT).

The order of ascending terminals from A to F can be associated with row and/or column positions. Depending on the interconnection of electrical connection lines with output terminals the indirect output paths may establish a shift in row and/or column positions of ±1, ±2, ±3, ±4 etc. The example depicted in the drawing shows a shift of −1 (control signal SEL−1), for example. The lower electrical connection line is used to establish readout paths from A_IN to B_OUT, B_IN to C_OUT, C_IN to D_OUT, D_IN to E_OUT, E_IN to F_OUT, and F_IN to A_OUT (not shown). The shifter unit could be used to shift by +1 (control signal SEL+1).

Figure 1B:
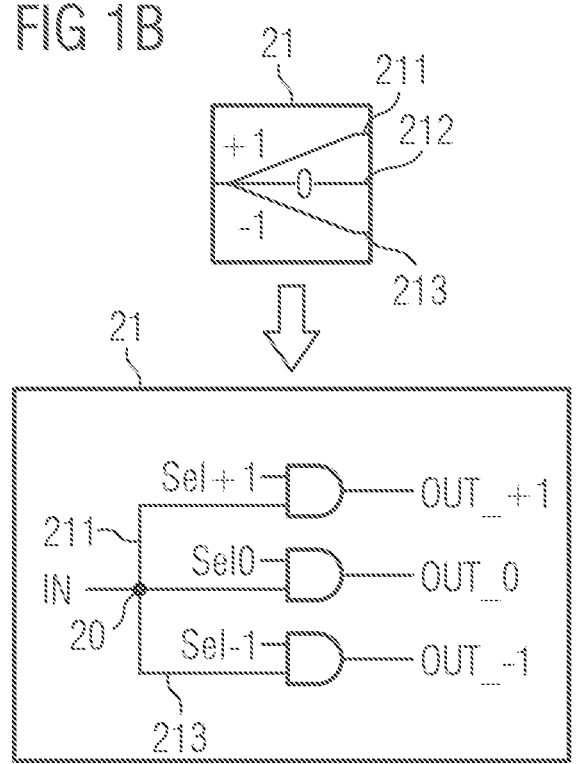
FIG. 1B shows an example embodiment of a shifter circuit in more detail.

FIG. 1B shows a shifter circuit in more detail. The shifter circuits 21 are represented by the graphic symbol in the upper part of the drawing. The graphic symbol indicates electrical connection lines 211, 212, 213 and their associated shifts +1, 0, and −1.

The shifter circuits 21 comprise the electrical connection lines 211, 212, 213 which split into the branches discussed above. Each electrical connection line is connected to dedicated logical gate (NAND or NOR, for example) via respective first logic input terminals. The gates comprise second logic input terminals to receive control signals SEL+1, SEL0, SEL−1. These control signals can be received via the control terminal 23 of the readout circuit 20, for example. The control signals SEL+1, SEL0, SEL−1 may be provided by an external terminal connected to the control terminal 23 or by means of internal components such as a microprocessor or state machine, or the like. For example, the internal components can be integrated into a same chip with the sensor device. The control signals SEL+1, SEL0, SEL−1 select the electrical connection lines 211, 212, 213 and thereby establish the readout paths OUT+1, OUT0, and OUT−1, respectively.

During operation it is possible to guide event pulses generated by the SPADs along the electrically connecting readout paths. In this example, pulses generated by array by −1 row position, e.g. SPAD SA1 is shifted along the row to readout B_OUT, SPAD SB1 to readout C_OUT, and so on. Thus, all SPADs are shifted by the same row position. The connections between input terminals and output terminals provide a convenient way to determine the number of positions that are shifted. This is possible based on a hard-wired circuit layout and, thus, offers a high degree of flexibility.

Figure 2:
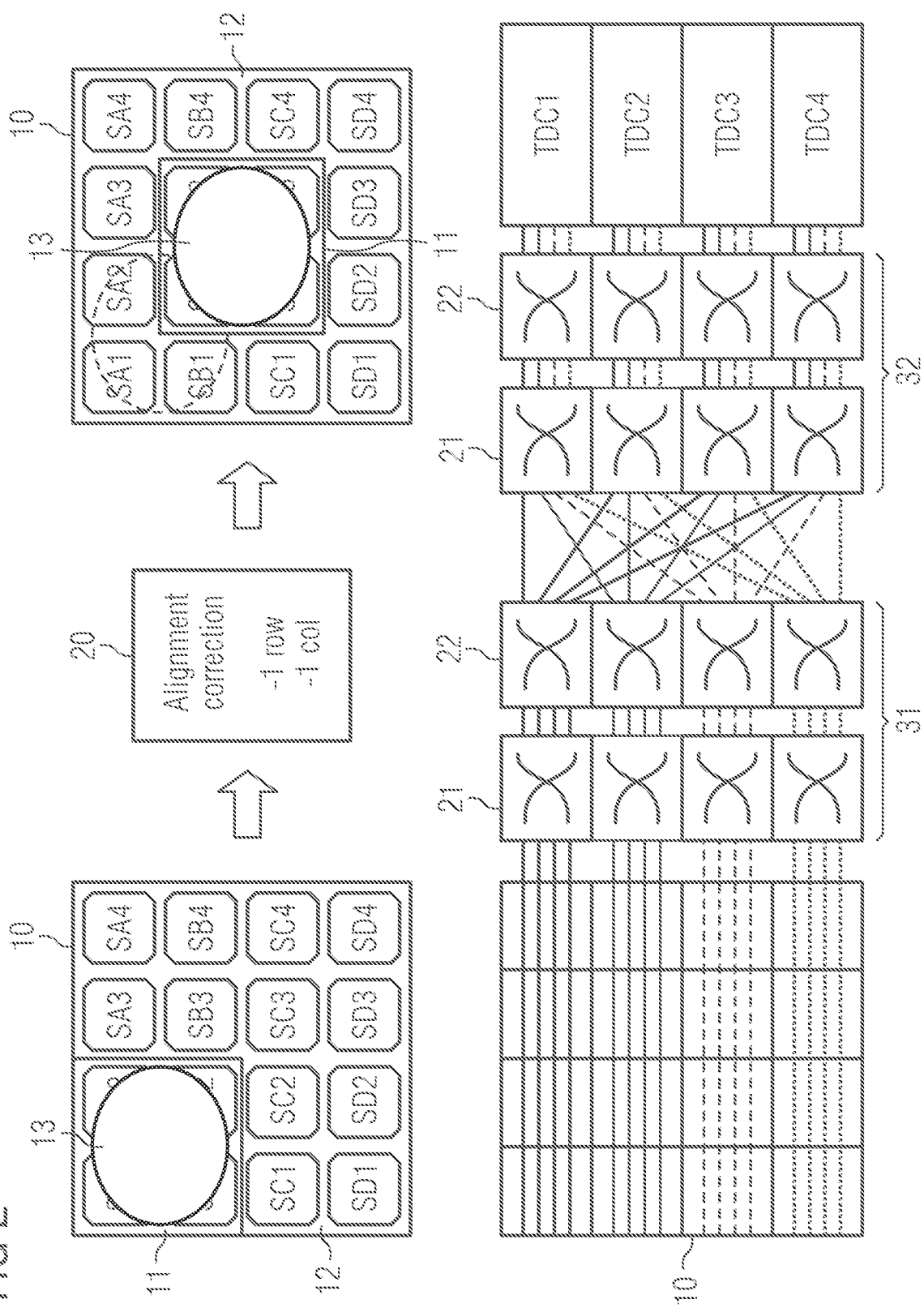
FIG. 2 shows an example embodiment of a sensor device.

FIG. 2 shows an example embodiment of a sensor device. The array 10 of photodetectors comprises individual SPADs which are arranged in rows and columns. A row position is denoted with a capital letter from A, B, C and D. A column position is denoted with an integer number from 1, 2, 3, and 4. For example, the SPAD located in the first row and first column, i.e. at row position A and column position 1, is denoted by the reference numeral SA1. The drawing shows the SPADs using this nomenclature. Furthermore, the drawings indicates a first subarray 11 and a second subarray 12.

Consider a sensor module (not shown) and the array 10 implemented inside the sensor module. During assembly the array 10 is aligned with a lens or optics which is arranged in the module, e.g. as part of a sensor package. Light incident of the sensor module is directed inside the module and towards the array 10 by means of the lens, for example. However, as depicted in the upper left part of the drawing a spot 13 of incident light illuminates only the upper-left zones of the array. In this example, an alignment error is shown as an offset of one zone, e.g. a shift of spot 13 along the rows and columns by one row and column position. Due to the misalignment between sensor and lens the spot 13 is mapped to a different region on the array 10.

The readout circuit 20 is indicated in the upper middle part of the drawing as correcting the alignment error by one row and one column position (−1 for both cases). The aligned configuration shown in the upper right part of the drawing. With the offsets applied, the spot 13 can be considered shifted along the rows and column. This resulting configuration corresponds to the situation where light illuminates the first subarray 11 in the center of the array 10 (see spot 13). In this example the first subarray 11 comprises four zones defined by SPADs SB2, SB3, SC2, and SC3, respectively. The center is surrounded by the second subarray 12 which constitutes a ring of SPAD zones for redundancy. The redundant area occupied by the second array 12 can be used to account for misalignment, e.g. the spot 13 does not leave the SPAD array 10.

The lower part of the drawing shows a possible embodiment of a readout architecture. The readout architecture can be implemented as a separate tier and arranged above or below the array 10, which may be arranged as another tier. However, the readout architecture may also be implemented next to the array or between photodetectors or on a backside of the array 10 as shown in the drawing. The readout architecture comprises the array 10 and a readout circuit 20 having a first cascade 31 and a second cascade 32.

The first cascade 31 comprises a first and a second shifting unit with four shifter circuits 21 and four selector circuits 22, respectively. The first shifting unit is connected to the array 10 via input terminals. Furthermore, the first shifting unit and the second shifting unit are connected in series. In this configuration the first and second shifting units are implemented as row shifting units. In fact, the first shifting unit is arranged to shift ±1 row positions and the second shifting unit is arranged to shift ±2 row positions.

The second cascade 32 comprises a third and a fourth shifting unit with four shifter circuits 21 and four selector circuits 22, respectively. Moreover, the third shifting unit is connected to the second shifting unit in a crosswise fashion such that rows are transposed to columns and vice versa. In this configuration the third and fourth shifting units are implemented as row shifting units. The second cascade 32 comprises four converter output terminals which are connected to four time-to-digital converters TDC1, TDC2, TDC3, TDC4, respectively. In fact, the third shifting unit is arranged to shift ±1 column positions and the fourth shifting unit is arranged to shift ±2 column positions.

The sensor device shown in the drawing is misaligned with an offset of 1 row position and 1 column position. In order to compensate for this optical offset the first subarray is shifted by a reversed offset of −1 row position and −1 column position. Effectively the first subarray 11 is shifted from the center of the array 10 to overlap with the spot 13 illuminating the array. This can be achieved by means of the first and second cascades 31, 32 and control signals applied to the shifting units comprised by the cascades. Due to the serial connection of cascades the shifting is executed in a serial manner, e.g. first shifting the row positions and followed by shifting the column positions, or vice versa.

Consider the first cascade 31. A control signal SEL−51 is applied to the first row shifting unit. The readout paths in the first row shifting unit are established along the electrical connection lines 213, which leads to a shift of the first subarray of −1 row positions. Corresponding sensor signals such as event pulses of the SPADs are routed to the second row shifting unit. Another control signal SEL0 is applied to the second row shifting unit. The readout paths in the first row shifting unit are established along the electrical connection lines 212, which leads to a shift of the first subarray of 0 row positions. Thus, the first subarray 11 is not shifted. After passing the first cascade 31 the subarray has been shifted by −1 row positions.

Consider the second cascade 32. Due to the crosswise interconnection to the first cascade 31 rows are transposed into columns. A control signal SEL−1 is applied to the third row shifting unit. The readout paths in the third row shifting unit are established along the electrical connection lines 213, which leads to a shift of the first subarray of −1 column positions. Corresponding sensor signals such as event pulses of the SPADs are routed to the fourth row shifting unit. Another control signal SEL0 is applied to the fourth row shifting unit. The readout paths in the fourth row shifting unit are established along the electrical connection lines 212, which leads to a shift of the first subarray of 0 row positions. Thus, the first subarray is not shifted. After passing the second cascade 32 the subarray 11 has been shifted by −1 row positions.

As a consequence of shifting the SPADs of the first subarray 11 are electrically connected to the converter output terminal TDC OUT. The converter output terminals are connected to the respective time-to-digital converters TDC1, TDC2, TDC3, TDC4. As a consequence the SPADs of the first subarray 11 are active and the SPADs of the second array 12 are inactive or redundant. In other words, the sensor signals, such as an event pulses of the SPADs are routed to the time-to-digital converters for further processing. The readout paths of the SPADs of the second array 12, however, are not electrically connected to the converter output terminals TDC_OUT and, thus, are not connected to a time-to-digital converter TDC1, TDC2, TDC3, TDC4.

However, whether a SPAD is associated with the first subarray 11 or the second subarray 12 is determined by means of the control signals. Thus, the inactive photodetectors of the second subarray can be considered as redundant photodetectors which can be activated if need be, e.g. as a result of a calibration process.

Shifting of the first subarray 11 can in principle compensate for an offset introduced by optical misalignment, e.g. by introducing a reversed offset using the readout paths. Therefore sensor signals essentially become re-centered before entering the time-to-digital converters. Misalignment is compensated by re-centering a spot of incident light to the SPAD of the first subarray 11, for example. Therefore a hard-wired interface connecting the converter output terminals TDC_OUT to the TDCs can be used. No multiplexing or complex switching schemes need to be used. This technique can be scaled to arrays of any number of SPADs and other types of photodetectors. Furthermore, no active lens alignment is needed, e.g. during the assembly process of a sensor module or packaging. This allows for lower costs. The proposed sensor device can be used in various optical sensor types, such as time-of-flight systems, or generally, in various imaging systems as detailed above.

Time-of-flight applications benefit from fast response times and low propagation delay from the photodetectors to the time-to-digital converters. The complex routing introduced with the readout circuit 20 may introduce a propagation delay from between the individual photodetectors and the time-to-digital converters, TDC1 to TDC4. Thus, accuracy of time-of-flight typically benefit from making the propagation delays equal or indistinguishable within the measurement precision in order to avoid introducing a systematic error in the measurement. Propagation delays of the readout paths can be altered using symmetric logic gates as selector circuits.

Figure 3:
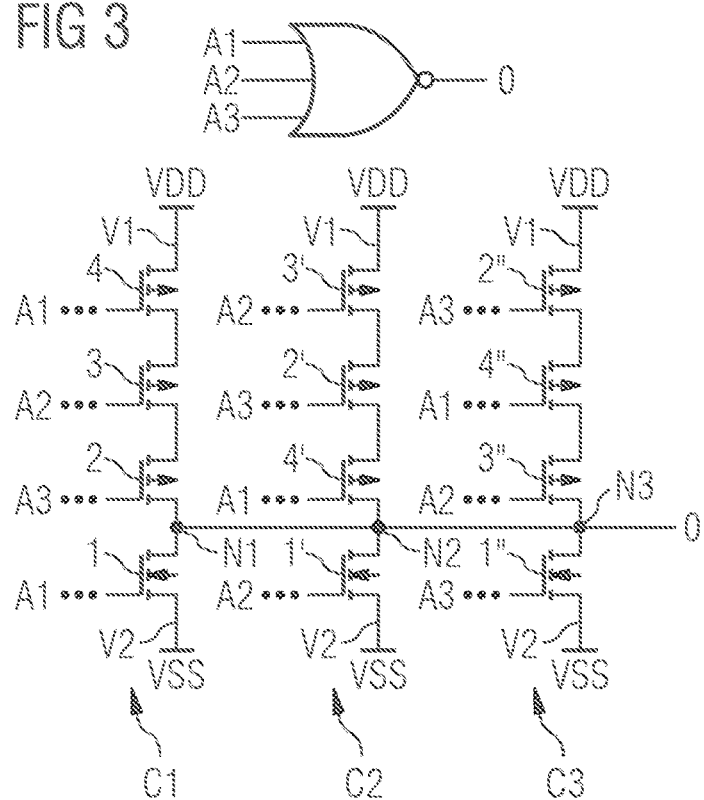
FIG. 3 shows an example of a selector circuit implemented as a symmetric NOR-gate.

FIG. 3 shows an example of a selector circuit implemented as a symmetric NOR-gate with cross-coupled PMOS branches or current paths. The drawing shows a circuit layout of a NOR-gate with three input terminals with equal propagation delay. The NOR-gate has a first input terminal A1, a second input terminal A2, a third input terminal A3, and an output terminal O.

The NOR-gate comprises a first current path C1 comprising a first transistor 1, a second transistor 2, a third transistor 3 and a fourth transistor 4. A second current path C2 comprises a first transistor 1', a second transistor 2', and a third transistor 3' and a fourth transistor 4'. Finally, a third current path C3 comprises a first transistor 1", a second transistor 2", and a third transistor 3" and a fourth transistor 4". In this example embodiment the second, third and fourth transistors of the current paths are of a same type, e.g. an n-type transistor, or NMOS, or a p-type transistor, or PMOS. The first transistors 1, 1', and 1" of the current paths C1, C2, and C3, however, are of a type different than the other transistors, e.g. an n-type transistor, or NMOS, or a p-type transistor, or PMOS. The transistors of a given current path C1, C2, C3 are connected in series along their signal sides between a supply voltage node V1 to apply a supply voltage VDD to the logic gate and a reference voltage node V2 to apply a reference voltage VSS. Respective control sides of the transistors are connected to the three input terminals as will be discussed below.

The first transistor 1, the second transistor 2, the third transistor 3 and the fourth transistor 4 of the first current path C1 are connected in series along their signal sides in the first current path C1 between the supply voltage node V1 to apply the supply voltage VDD to the logic gate and the reference voltage node V2 to apply the reference voltage VSS.

The first transistor 1', the second transistor 2', the third transistor 3' and the fourth transistor 4' of the second current path C2 are connected along their signal sides in series in the second current path C2 between the supply voltage node V1 to apply the supply voltage VDD to the logic gate and the reference voltage node V2 to apply the reference voltage VSS. However, the first transistor 1' is connected to the fourth transistor 4' which is then connected to the second transistor 2' which, finally, is connected to the third transistor 3'. The third transistor 3' is connected to the supply voltage node V1.

The first transistor 1", the second transistor 2", the third transistor 3" and the fourth transistor 4" of the third current path C3 are connected along their signal sides in series in the third current path C3 between the supply voltage node V1 to apply the supply voltage VDD to the logic gate and the reference voltage node V2 to apply the reference voltage VSS. However, the first transistor 1" is connected to the third transistor 3" which is then connected to the fourth transistor 4" which, finally, is connected to the second transistor 2". The second transistor 2" is connected to the supply voltage node V1.

A first, second, and a third circuit node N1, N2, and N3 are connected in series and, further, connected to output terminal O. The first circuit node N1 connects the signal sides of the first and second transistors 1, 2 of the first current path C1. The second circuit node N2 connects the signal sides of the first and fourth transistors 1', 4' of the second current path C2. The third circuit node N3 connects the signal sides of the first and third transistors 1", 3" of the third current path C3.

Regarding the NOR-gate shown in FIG. 3, connections via the control sides of the transistors, i.e. gate connections of the transistors, in the current paths C1, C2 and C3 are cross-coupled at their gate terminals. Thus, the transistors 2, 2' and 2" in the current paths C1, C2, and C3 have their gate terminals connected to input terminal A3. Furthermore, the gate connections of the transistors 3, 3', 3" in the current paths C1, C2 and C3 are cross-coupled to input terminal A2. In the same way, the gate connections of the transistors 4, 4' and 4" in the current paths C1, C2 and C3 are cross-coupled and driven from the same input terminal A1. The first transistors 1, 1', and 1" of the first, second, and third current paths C1, C2, and C3 are coupled to the first, second, and third input terminal A1, A2, and A3, respectively.

In comparison to a conventional NOR-gate, the branch of the series connected P-MOS transistors is split, according to the embodiment of the NOR-gate shown in FIG. 3, into three branches/current paths C1, C2 and C3 with the transistors cross-coupled gate connections. The gate connections of the transistors 2, 2' and 2" are driven from the input terminal Al, the gate connections of the transistors 3, 3' and 3" are driven from the input terminal A2, and the gate connections of the transistors 4, 4' and 4" are driven from the input terminal A3.

It can be shown that a signal propagation delay along the three branches and between a change of state of an input signal and the occurrence of the corresponding change of state of the output signal is equal for the branches, This is mainly due to the proposed cross-coupling of the transistors of the current paths C1, C2, and C3 to their respective terminals A1, A2, and A3. Thus, implementing the selector circuits as symmetric NOR-gate as discussed above may improve overall signal delay in time-of-flight applications and, consequently, may lead to improved accuracy of time-of-flight detection.

Figure 4:
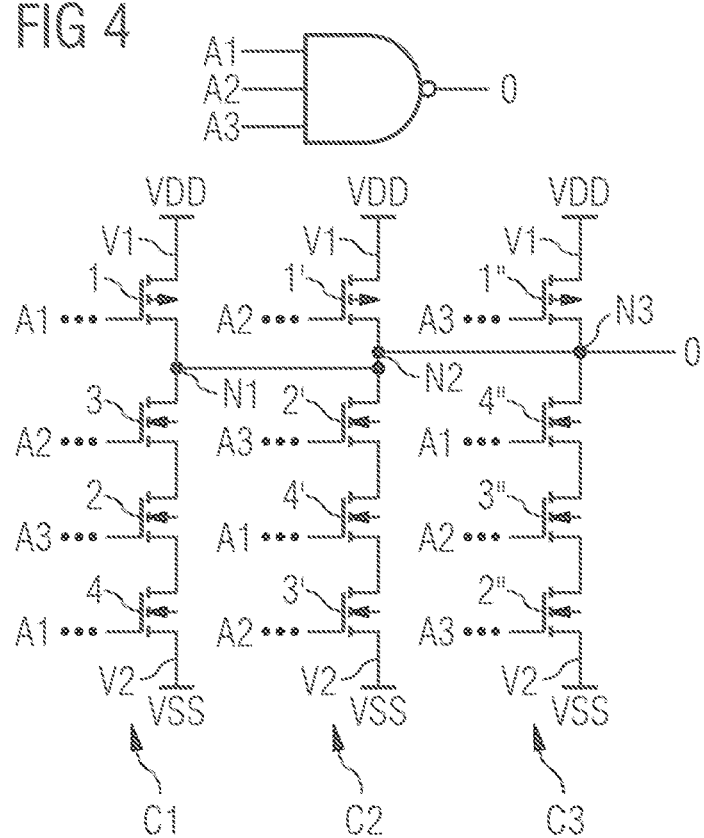
FIG. 4 shows another example of a selector circuit implemented as a symmetric NAND-gate.

FIG. 4 shows an example of a selector circuit implemented as a symmetric NAND-gate with cross-coupled PMOS branches or current paths. The drawing shows a circuit layout of the NAND-gate with three input terminals A1, A2 and A3 with equal propagation delay. The circuit layout is similar to the NOR-gate discussed with respect to FIG. 3. The transistors are of interchanged type, e.g. the first transistors 1, 1', and 1" are of a different type as compared to the embodiment of FIG. 3, i.e. an n-type transistor, or NMOS transistor of FIG. 3 becomes a p-type transistor, or PMOS in FIG. 4, and vice versa.

In more detail, NAND-gate differs from the NOR-gate in that the first transistors 1, 1', and 1" have changed positions in series connections of transistors. The first transistor 1 of the current path C1 now is connected like the fourth transistor 4 of the first current path C1 of the NOR gate. The first transistor 1' of the current path C2 now is connected like the third transistor 3' of the second current path C2 of the NOR gate. The first transistor 1" of the current path C3 now is connected like the second transistor 2" of the third current path C3 of the NOR gate. Similarly, the fourth transistor 4 of the first current path C1 is connected like the first transistor 1 of the first current path C1 of the NOR gate. The third transistor 3' of the second current path C2 is connected like the first transistor 1' of the second current path C2 of the NOR gate. The second transistor 2" of the second current path C3 is connected like the first transistor 1" of the third current path C3 of the NOR gate.

A first, second, and a third circuit node N1, N2, and N3 are connected in series and, further, connected to an output terminal O. The first circuit node N1 connects the signal sides of the first and third transistors 1, 3 of the first current path C1. The second circuit node N2 connects the signal sides of the first and second transistors 1', 2' of the second current path C2. The third circuit node N3 connects the signal sides of the first and fourth transistors 1", 4" of the third current path C3.

Apart from their functional logic, the NAND- and NOR-gate have similar properties. Both logic gates are symmetric and allow for equal propagation delay. Thus, implementing the selector circuits as symmetric NAND-gate as discussed above may improve overall signal delay in time-of-flight applications and, consequently, may lead to improved accuracy of time-of-flight detection.

The invention claimed is:

1. A sensor device, comprising:
an array of photodetectors,
a readout circuit connected to the array of photodetectors and providing dedicated readout paths for each photodetector in the array, respectively, further comprising at least one control terminal,
an array of time-to-digital converters electrically connected to converter output terminals of the readout circuit; wherein
depending on a control signal to be applied at the at least one control terminal, the readout circuit is arranged to electrically connect through the readout paths of photodetectors of a first subarray to the converter output terminals of the readout circuit, respectively, thereby rendering the photodetectors of the first subarray active and photodetectors of a second subarray inactive,
the readout circuit comprises a plurality of input terminals, wherein each photodetector is connected to a dedicated input terminal of the plurality of input terminals,
the readout circuit comprises a plurality of output terminals, wherein the plurality of output terminals comprises the converter output terminals; wherein:
in a ground configuration, the readout paths electrically connect the input terminal dedicated to a photodetector of the array of photodetectors to a dedicated output terminal. respectively,
in a calibrated configuration, the readout paths electrically connect the input terminal dedicated to a photodetector of the array of photodetectors to a neighboring output terminal different from the dedicated output terminal in the ground configuration, respectively, and
the control signal determines whether the sensor device is in the ground configuration or in the calibrated configuration.

2. The sensor device according to claim 1, wherein the readout circuit is arranged to electrically connect through the readout paths of photodetectors of the first subarray to the output terminals of the readout circuit all at a time, such that a number of photodetectors in the first subarray may correspond to a number of time-to-digital converters in the array of time-to-digital converters.

3. The sensor device according to claim 1, wherein the photodetectors of the array of photodetectors are arranged in rows and/or columns,
in the ground configuration, the first subarray is determined by photodetectors located in a center of the array of photodetectors, and
in the calibrated configuration, the first subarray is shifted along the rows and/or columns such that the first subarray is determined by photodetectors located with an offset relative to the center of the array of photodetectors.

4. The sensor device according to claim 1, wherein
the readout circuit is arranged to shift the first subarray along the rows and/or columns by a same number of row positions and/or column positions, and
the shifting involves routing the readout paths between the input terminals and the output terminals.

5. The sensor device according to claim 3, wherein the readout circuit comprises:
at least one row shifting unit arranged to shift the first subarray along the rows relative to the array of photodetectors, and/or
at least one column shifting unit arranged to shift the first subarray along the columns relative to the array of photodetectors, wherein the at least one column shifting unit is connected in series with the at least one row shifting unit.

6. The sensor device according to claim 5, wherein the readout circuit comprises:
a cascade of row shifting units connected in series, wherein each row shifting unit in the cascade is arranged to shift the first subarray along the rows relative to the array of photodetectors by a different number of row positions, and/or
a cascade of column shifting units connected in series, wherein each column shifting unit in the cascade is arranged to shift the first subarray along the columns relative to the array of photodetectors by a different number of column positions.

7. The sensor device according to claim 5, wherein the at least one row shifting unit and/or the at least one column shifting unit comprise a number of shifter circuits and a same number of selector circuits, wherein the number of shifter circuits and the number of selector circuits correspond to the number of photodetectors in a row and/or in a column.

8. The sensor device according to claim 7, wherein
the shifter circuits are arranged to split the readout paths into a branch of electrical connection lines,
the electrical connection lines connect the input terminal dedicated to a photodetector of the array of photodetectors to the dedicated output terminal and to at least one neighboring output terminal different from the dedicated output terminal, respectively, and wherein
the electrical connection lines are selectable by means of the control signal, such that one of the electrical connection lines is activated while the other electrical connection lines are inactive.

9. The sensor device according to claim 8, wherein the selector circuits comprise
an input side connected to the electrical connection lines of at least two shifter circuits, and
an output side connected to the dedicated output terminals, respectively.

10. A sensor device, comprising:
an array of photodetectors,
a readout circuit connected to the array of photodetectors and providing dedicated readout paths for each photodetector in the array, respectively, further comprising at least one control terminal,
an array of time-to-digital converters electrically connected to converter output terminals of the readout circuit; wherein:
depending on a control signal to be applied at the at least one control terminal, the readout circuit is arranged to electrically connect through the readout paths of photodetectors of a first subarray to the converter output terminals of the readout circuit, respectively, thereby rendering the photodetectors of the first subarray active and photodetectors of a second subarray inactive, wherein:
the readout circuit is arranged to shift the first subarray along the rows and/or columns by a same number of row positions and/or column positions, and
the shifting involves routing the readout paths between the input terminals and the output terminals; wherein the readout circuit comprises:
at least one row shifting unit arranged to shift the first subarray along the rows relative to the array of photodetectors, and/or
at least one column shifting unit arranged to shift the first subarray along the columns relative to the array of photodetectors, wherein the at least one column shifting unit is connected in series with the at least one row shifting unit,
a cascade of row shifting units connected in series, wherein each row shifting unit in the cascade is arranged to shift the first subarray along the rows relative to the array of photodetectors by a different number of row positions, and/or
a cascade of column shifting units connected in series, wherein each column shifting unit in the cascade is arranged to shift the first subarray along the columns relative to the array of photodetectors by a different number of column positions.

11. A sensor module comprising:
at least one sensor device according to claim 1,
a sensor package encapsulating the at least one sensor device and
optics arranged in the sensor package, wherein the first subarray of photodetectors is located in a field-of-view of the optics.

12. The sensor module according to claim 11, wherein the at least one sensor device, the sensor package and the optics are arranged as a time-of-flight sensor module.

13. An imaging system comprising:
at least one sensor device according to claim 1, and
a host system where the at least one sensor device is embedded in.

14. A method to operate a sensor device, the sensor device comprising an array of photodetectors, the method comprising the steps of:
providing dedicated readout paths for each photodetector in the array, respectively, using a readout circuit connected to the array of photodetectors,
applying a control signal to the readout circuit,
depending on the control signal, electrically connecting through the readout paths of photodetectors of a first subarray to dedicated time-to-digital converters, respectively, thereby rendering the photodetectors of the first subarray active and photodetectors of a second subarray inactive,
locating the first subarray in a center of the array of photodetectors in a ground configuration, and
shifting the first subarray depending on the control signal along the rows and/or columns such that the first subarray is located with an offset relative to the center of the array of photodetectors in a calibrated configuration, and wherein
the shifting involves routing the readout paths between input terminals and output terminals.

* * * * *